(No Model.)
D. A. JONES.
FOOT HOOK FOR HORSES.
No. 544,540. Patented Aug. 13, 1895.
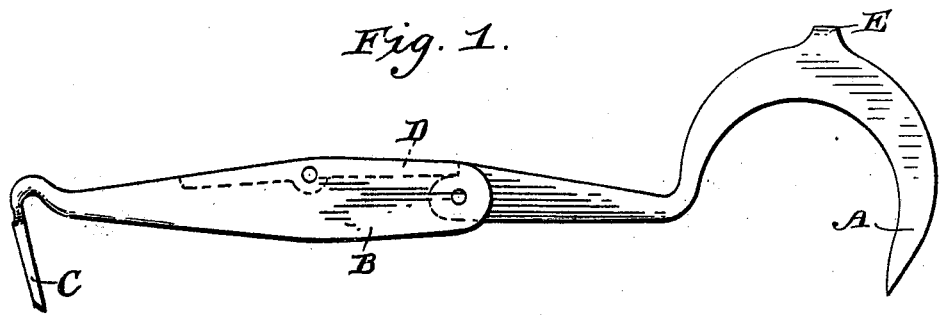
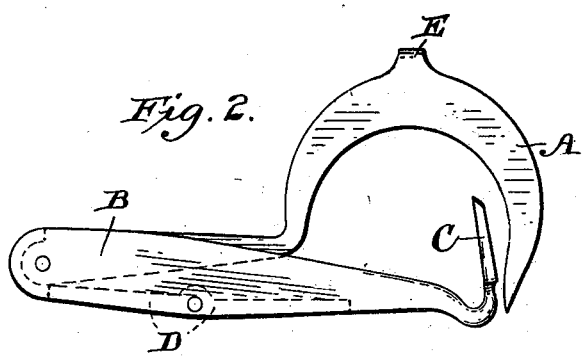 
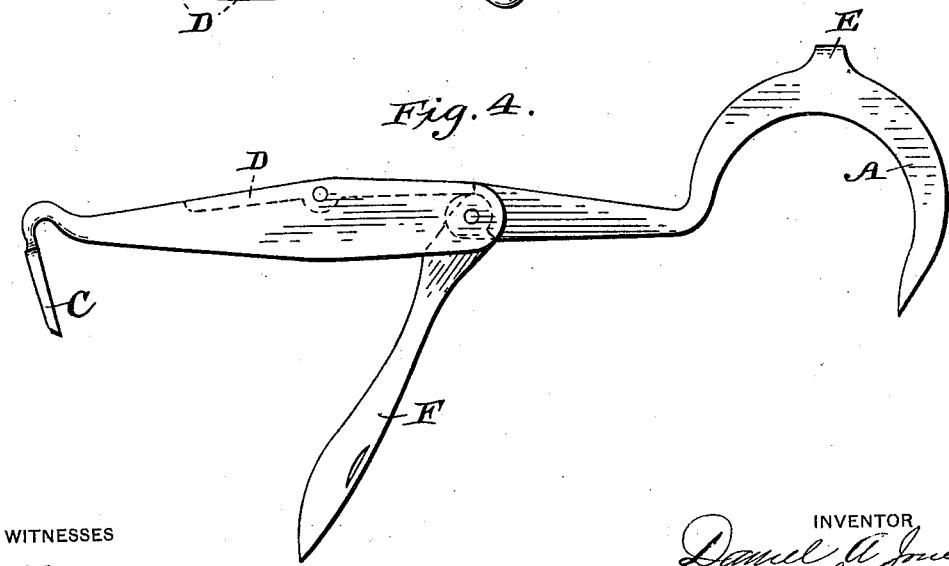
WITNESSES
INVENTOR
Daniel A. Jones

UNITED STATES PATENT OFFICE.

DANIEL A. JONES, OF OSHKOSH, WISCONSIN.

FOOT-HOOK FOR HORSES.

SPECIFICATION forming part of Letters Patent No. 544,540, dated August 13, 1895.

Application filed May 15, 1895. Serial No. 549,413. (No model.)

*To all whom it may concern:*

Be it known that I, DANIEL A. JONES, a citizen of the United States, residing at Oshkosh, in the county of Winnebago and State of Wisconsin, have invented certain new and useful Improvements in Foot-Hooks for Horses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in implements for cleaning horses' feet and hoofs; and it consists, essentially, in a foot-hook, a handle for the same provided with a closing-spring for said hook, and a small hoe for cleaning dirt from the outside of the hoof as well as around the frog, the whole capable of being closed into convenient form for carrying in the pocket.

It also consists of certain other novel constructions, combinations, and arrangements of parts, all of which will be hereinafter more particularly set forth and claimed.

In the accompanying drawings, forming part of this specification, Figure 1 is a side view of the implement open. Fig. 2 is a side view of the same closed. Fig. 3 is a detail end elevation of the hoe, and Fig. 4 is a modification of the device provided with a veterinary knife-blade closing alongside of the hook.

Similar letters refer to similar parts in each view.

A is the pivoted hook, and B the handle, provided with a back-spring D that bears against the end of said hook to retain the same open or closed.

C is a hoe at the end of the handle.

E is a screw-driver to be used when the implement is closed, and F, Fig. 4, is a veterinary knife-blade to adapt my invention for use of veterinary surgeons. The blade F is also engaged by the spring D to keep said blade in either an open or closed position.

The hoe C may be made of any width desired, and is especially adapted for cleaning the bottom of the hoof and also the outside of the hoof.

The hook A is pointed and is used to clean around the frog and in the corners and edges around the shoe.

My implement can be used rapidly, is convenient and durable, and when closed can be easily carried in the pocket.

My invention provides four combined implements—viz., a hook for cleaning the bottom of the foot, a hoe to clean the outside and inside of the hoof, a screw-driver for general use, and a knife for veterinary use.

Having now described my invention, what I claim as new, and desire to secure by Letters Patent, is—

1. A combined tool for cleaning horses' feet consisting of a handle, a hook pivotally mounted in said handle at one end, a back spring in said handle to retain the hook open or closed, and a hoe at the free end of the handle, substantially as described.

2. A combined tool consisting of a handle, a hook pivotally connected with said handle at one end, a back spring to retain the hook open or closed, a hoe at the free end of the handle, and a projection upon the outer periphery of the hook to form a screw-driver for use when the tool is closed, substantially as described.

3. A combined tool consisting of a handle, a cutting blade and a hook pivotally connected to said handle at one end, a back spring holding both the hook and the blade in position, and a hoe at the free end of the handle, substantially as described.

In testimony whereof I affix my signature in presence of two witnesses.

DANIEL A. JONES.

Witnesses:
FRANK BARNHART,
HENRY HENKEL.